Patented Aug. 25, 1931

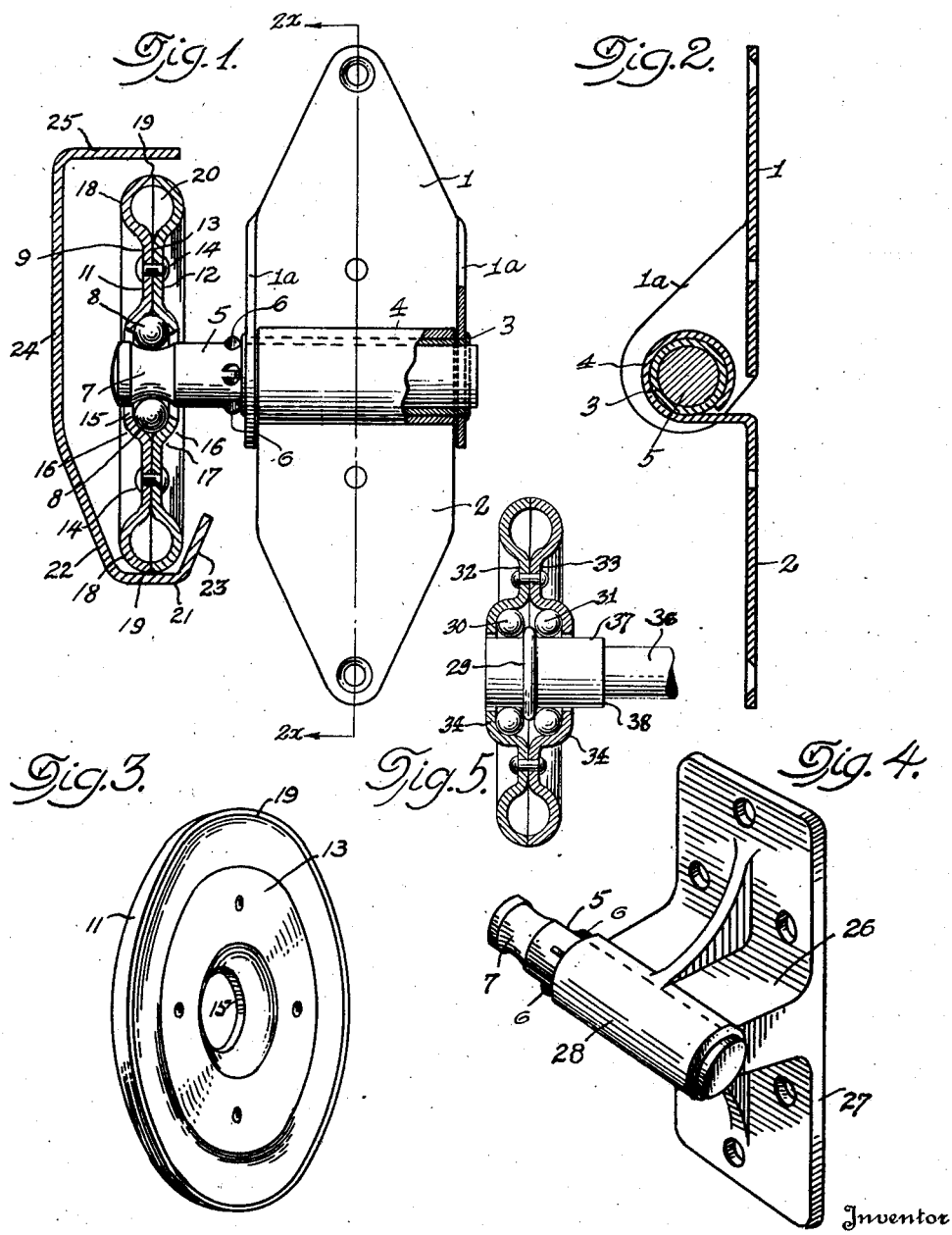

1,820,459

UNITED STATES PATENT OFFICE

CLARENCE G. JOHNSON, OF HARTFORD CITY, INDIANA

ROLLER DEVICE AND TRACK

Application filed December 1, 1926. Serial No. 151,884.

This invention relates to builder's hardware such as is applicable for the movable support of doors or other movable structures and which are characterized by the provision of a roller adapted to travel in or along a track, the movable object being connected to the axle of the roller, and has for its object to provide a simple constructed device of such type which lends itself to commercial production without complication of parts and which is by a novel association of the roller and its axle with means by which it may be attached to a movable object rendered capable of application in a manner and for purposes beyond that to which such devices are normally applicable.

The invention also contemplates the combination of a hinge and a roller whereby the pintle of the hinge forms the axle of the roller, and further wherein the said pintle is slidable in the hinge for the adjustment of the roller theretowards; and further contemplates providing for the prevention of binding of the said pintle in the hinge.

Another object of the invention is to provide a simply constructed form of roller wherein two preferably identical plates are secured together and so shaped that they form a tread and a ball race and to utilize in combination therewith an axle having a contemporary ball race, the balls being effectively enclosed and held in the races of the bearing and securing together of the two plates forming the roller on opposite sides of the balls.

Furthermore, it is proposed to provide the tread portion of such a roller by the providing of an annular corrugation in the outer marginal portions of each of the plates so that such marginal portions are expanded outwardly of the meeting faces of the plates and then inwardly thereof whereby their edges meet in a plane approximating that of the said meeting faces of the plates.

Still further objects subsidiary to or resulting from the aforesaid objects or from the construction or operation of the invention as it may be carried into effect will become apparent as the said invention is hereinafter further disclosed.

In carrying the said invention into effect I may provide as an improved article of builder's hardware, a hinge having a sliding pintle and extending at one end from the interlocking portions of the said hinge this end of the pintle being annularly recessed to form a ball race accommodating balls which are held in place by the hub portion of a pulley comprising two plates or disks secured together, the inner margins of which disks are flared in opposite directions to form an outer race and housing for the said balls so that when the plates are brought together and secured against separation the said balls entering between the flared inner margins and seating in the recess of the pintle prevent removal of the plates from the pintle and form the bearings for the said roller. The outer marginal portions of the plates are annularly corrugated so that when brought together they form a tubular rim, the edges of the said disks meeting on the tread portion of the said rim in a plane common with that of the meeting faces of the two plates, the said wheel being movable towards and from the hinge within limits by reason of the slidable nature of the pinion and the secure locking of the said wheel on the said pintle by the engagement of the balls with the hub of the two-part wheel and the annular recess of the said pintle.

All of which is more particularly described and ascertained hereinafter by way of example, having reference to the accompanying drawings, wherein—

Figure 1 is a sectional elevation of a roller equipped hinge embodying said invention, the said view also illustrating an improved track for the guidance of the roller;

Figure 2 is a section on the line 2x—2x through the two members of the hinge;

Figure 3 is a detail perspective view of one of the disks of which the roller is formed;

Figure 4 illustrates a modification of the invention wherein a fixed bracket is utilized in place of a flexible hinge, and Figure 5 is a sectional elevation of a modified form of roller and spindle.

Similar characters of reference indicate similar parts in the several Figures of the drawings.

1 and 2 are the plates of a bracket in the form of a hinge, the plate 1 being indicated as having outwardly projecting ears 1a thereon, between and through which extends a tubular bearing member 3, and the plate 2 is provided with a tubular portion 4 embracing the said bearing member, so that the member 4 is rotatable about the member 3.

5 is a pintle or spindle slidably mounted in the said member 3 of the hinge plate 1, so that the said member 3 forms a bearing for both the tubular member 4 of the plate 2 and the pintle, and eliminates any friction between the said pintle and the said member 4 whereby irrespective of any strain which may be set up in use between the plates of the hinge, no binding of the pintle which would prevent or restrict its free sliding in an axial direction is set up. The said pintle is preferably provided with abutments 6 preventing its entrance into the bearing member of the hinge beyond a desired extent, and the said pintle is designed to extend substantially from one end of the said bearing member, this projecting end being provided with an annular groove 7 which forms the internal race for a series of balls 8 forming the ball bearing of a roller generally numbered 9 which may in use travel within a track such as that generally numbered 10 in the drawings. A sliding of the pintle in the said bearing member 3 of the hinge permits the roller to adjust itself or to be adjusted to accommodate itself to various positions which the track may occupy relative to the hinge within limits governed by the extent to which the pintle is slidable.

The roller or wheel is shown as comprising two disks 11 and 12, the inner faces of which meet at 13, which disks are secured together such as by rivets 14, and these disks are preferably identical in form as will be apparent from the drawings, each disk being provided with a central orifice 15 of a slightly greater diameter than the pintle so that they may be passed thereover and provided with a flared inner margin 16 contiguous to such central orifice so that when the two disks are secured together in the manner shown the said inner flared portions 16 of the said disk form a recess 17, the inner walls of which act as a race for the balls 8. Obviously in this construction the balls are placed in position in the annular groove 7 of the pintle and relative to the inner wall of the flange 16 of one of the disks before the other disk is applied thereto as they could not be passed into such position after the assembling of the disks together about the pintle due to the fact that the inner edges of the said disks so closely approach the outer surface of the pintle and for the same reason when the disks are so secured together about the balls and the pintle the said balls will effectively prevent the removal of the disks from the pintle.

This forms a very simple and reliable method of forming a wheel and effecting its assembling together and securing thereof in position relative to an axle which in the described device is the pintle 5. The outer margin of each disk is best formed with a corrugation 18 so that when the two disks are reversed in the manner described and brought together face to face the edges 19 are juxtaposed circumferentially along the tread of the wheel and the said corrugations form a tubular portion 20 giving substantial breadth to the said tread. In this way a two-piece wheel is formed from disks of identical form which admits of production at very low cost and provides an external race for the ball bearing of effective design which efficiently houses the balls and secures them in position about the inner race.

The track 10 lends itself excellently to use with a device of the type referred to having the track portion proper 21 formed with inclined inner and outer walls 22 and 23 guiding the roller or wheel along the center part of the track so that the wheel or the pintle is prevented from coming into frictional contact with the side wall 24 of the track, the outer wall 23 preventing the wheel from slipping laterally from the said track, and as a means of preventing the wheel from being lifted over the said side wall 23, except when positively tilted for that purpose, an upper or guard wall 25 is provided acting as a guard to limit the upward movement of the wheel. The said wheel may under favorable circumstances however be tilted outwardly until the tread portion 20 is clear of the guard wall 25 when it may be lifted out of the track.

As shown in Figure 4, the pintle 5 may be housed in any suitable form of bracket such as that shown in the said figure, wherein 26 is a solid bracket having a base plate 27 and a tubular portion 28 in which the pintle is slidably housed.

Figure 5 illustrates an arrangement of roller and spindle which lends itself excellently to use with heavy structures, such as large garage doors, 36 being the spindle which has an enlarged end portion 37 providing an abutment or shoulder 38. The enlarged end 37 is provided with an annular stop or rib 29 which projects between two sets of balls 30 and 31. The disks or plates 32 and 33 of the roller are flared at 34 to embrace the balls and form a race maintaining them in position about the stop 29.

The form of hinge and roller described, as well as the track section, is very well adapted to use in connection with doors of the type illustrated in my co-pending application, Serial No. 741,837, filed October 6, 1924, and lends itself excellently to the carrying out of the operations of such a tool.

This invention may be developed within the scope of the following claims without departing from the essential features of the said invention, and it is desired that the specification and drawing be read as merely illustrative and not in a limiting sense except as necessitated by the prior art.

What I claim is:—

1. In a device of the class described, the combination with a hinge, of a pintle slidably mounted therein and projecting therefrom, and a roller journalled directly on the projecting end of said pintle and movable relative to said hinge by virtue of the sliding of said pintle in said hinge.

2. The combination according to claim 1, wherein the pintle is provided with means limiting the movement of said roller towards said hinge.

3. The combination according to claim 1, wherein said hinge comprises a pair of plates, one of which is provided with a tubular bearing member about which the other of said plates is swingable and said pintle is slidable in said tubular bearing member.

4. The combination according to claim 1, wherein said hinge comprises a plate having outwardly projecting ears thereon between which ears extends a tubular bearing member, and a second plate having a tubular portion embracing said bearing member, said pintle being slidable in said tubular bearing member.

5. Hardware for the movable support of structures comprising a bracket having a tubular portion, a pintle slidable in the tubular portion of said bracket and projecting therefrom, and a roller journalled directly on the projecting end of said pintle, said roller being movable by the sliding of said pintle towards or from said bracket.

6. A device according to claim 5, wherein the pintle is provided with means limiting the approach of said roller to said bracket.

In testimony whereof I affix my signature.

CLARENCE G. JOHNSON.